United States Patent
Lin et al.

(10) Patent No.: US 8,270,266 B2
(45) Date of Patent: Sep. 18, 2012

(54) METHODS AND DEVICES FOR DETECTING WOBBLES ON AN OPTICAL DISC

(75) Inventors: Tzu-Chieh Lin, Hsinchu (TW); Yuh Cheng, Hsin-Chu Hsien (TW); Chih-Ching Chen, Miaoli County (TW); Tysh-Bin Liu, Hsinchu County (TW); Yu-Hsuan Lin, Taichung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 439 days.

(21) Appl. No.: 12/357,409

(22) Filed: Jan. 22, 2009

(65) Prior Publication Data

US 2009/0262620 A1    Oct. 22, 2009

Related U.S. Application Data

(60) Provisional application No. 61/045,618, filed on Apr. 17, 2008, provisional application No. 61/050,264, filed on May 5, 2008.

(51) Int. Cl.
*G11B 7/00* (2006.01)

(52) U.S. Cl. ............... 369/44.27; 369/53.22; 369/44.25

(58) Field of Classification Search .................. None
See application file for complete search history.

(56) References Cited

U.S. PATENT DOCUMENTS

| | | | | |
|---|---|---|---|---|
| 5,177,726 A * | 1/1993 | Terada | ................. | 369/44.27 |
| 5,978,333 A | 11/1999 | Kobayashi et al. | | |
| 6,594,210 B2 * | 7/2003 | Kumagai | ................. | 369/47.17 |
| 6,785,207 B2 * | 8/2004 | Nishimura et al. | ........ | 369/47.27 |
| 7,558,171 B2 * | 7/2009 | Ogura et al. | ............... | 369/47.51 |
| 7,852,728 B2 * | 12/2010 | Ogura et al. | ............... | 369/59.22 |
| 7,859,961 B2 | 12/2010 | Nakaseko | | |
| 7,995,448 B2 * | 8/2011 | Kanda et al. | ............. | 369/124.01 |
| 8,111,595 B2 | 2/2012 | Ichimura | | |
| 2003/0099180 A1 | 5/2003 | Park | | |
| 2006/0120252 A1 * | 6/2006 | Kanda et al. | .................. | 369/125 |
| 2007/0058739 A1 * | 3/2007 | Aytur et al. | .................. | 375/260 |
| 2007/0280072 A1 | 12/2007 | Hsieh | | |
| 2009/0257334 A1 * | 10/2009 | Ogura et al. | ............... | 369/59.23 |

FOREIGN PATENT DOCUMENTS

JP    2005293637    10/2005
TW    200818136    4/2008

* cited by examiner

*Primary Examiner* — Van Chow
(74) *Attorney, Agent, or Firm* — Winston Hsu; Scott Margo

(57) ABSTRACT

A device for detecting wobbles on an optical disc is provided, where the device is utilized for generating a wobble signal according to a plurality of detection signals. The device includes an analog signal processing circuit, a pair of analog-to-digital converters (ADCs), and a digital signal processing circuit. The analog signal processing circuit is arranged to perform analog signal processing on the detection signals to generate a plurality of output signals. In addition, the pair of ADCs are arranged to digitalize the output signals to generate a plurality of digital values. Additionally, the digital signal processing circuit is arranged to perform digital signal processing on the digital values and generate an arithmetic output, where the arithmetic output is utilized for generating the wobble signal or utilized as the wobble signal. An associated method for detecting wobbles on an optical disc is further provided.

21 Claims, 12 Drawing Sheets

METHODS AND DEVICES FOR DETECTING WOBBLES ON AN OPTICAL DISC

CROSS REFERENCE TO RELATED APPLICATIONS

This application claims the benefit of U.S. Provisional Application No. 61/045,618, which was filed on Apr. 17, 2008, and entitled "METHOD AND APPARATUS FOR WOBBLE DETECTION". This application further claims the benefit of U.S. Provisional Application No. 61/050,264, which was filed on May 5, 2008, and entitled "METHOD AND APPARATUS FOR WOBBLE DETECTION".

BACKGROUND

The present invention relates to wobble detection of optical storage devices, and more particularly, methods and devices for detecting wobbles on an optical disc.

A conventional wobble detection circuit typically comprises a lot of large area components, such as analog automatic gain control (AGC) circuits and analog filters (e.g. an analog low pass filter (LPF) and an analog band pass filter (BPF)). According to the related art, large chip areas are required for implementing the conventional wobble detection circuit since these analog components are operated at a very low frequency. Within some of the analog AGC circuits mentioned before, an envelope detector and an integrator typically occupy a large chip area since the envelope detector and the integrator have to be operated at a very low frequency.

In practice, when implementing respective voltage gain amplifiers (VGAs) in some analog automatic gain control (AGC) circuits, the VGAs should be exactly the same in order to guarantee the quality of the detected wobble signal. As a result, decreasing the size of the VGAs is impractical since it is hard to maintain the balance between the VGAs when the size of the VGAs is small. A novel method for performing wobble detection is therefore required.

SUMMARY

It is therefore an objective of the claimed invention to provide methods and devices for detecting wobbles on an optical disc, in order to solve the above-mentioned problem.

A device for detecting wobbles on an optical disc is provided, where the device is utilized for generating a wobble signal according to a plurality of detection signals. An exemplary embodiment of the device comprises an analog signal processing circuit, a pair of analog-to-digital converters (ADCs), and a digital signal processing circuit. The analog signal processing circuit is arranged to perform analog signal processing on the detection signals to generate a plurality of output signals. In addition, the pair of ADCs are arranged to digitalize the output signals to generate a plurality of digital values. Additionally, the digital signal processing circuit is arranged to perform digital signal processing on the digital values and generate an arithmetic output, wherein the arithmetic output is utilized for generating the wobble signal or utilized as the wobble signal.

An associated method for detecting wobbles on an optical disc is further provided, where the method is utilized for generating a wobble signal according to a plurality of detection signals of a split photo-detector (PD) of an optical pickup unit (OPU). An exemplary embodiment of the method comprises: performing analog signal processing on the detection signals to generate a plurality of output signals; digitalizing the output signals to generate a plurality of digital values; and performing digital signal processing on the digital values and generating an arithmetic output, wherein the arithmetic output is utilized for generating the wobble signal or utilized as the wobble signal.

An associated device for detecting wobbles on an optical disc is further provided, where the device is utilized for generating a wobble signal according to a plurality of detection signals of a PD of an OPU. An exemplary embodiment of the device comprises a pair of wobble processing modules and a specific arithmetic unit. The pair of wobble processing modules are arranged to perform wobble processing according to the detection signals to generate a plurality of digital values. In addition, the specific arithmetic unit is arranged to generate an arithmetic output according to the digital values, wherein the arithmetic output is utilized for generating the wobble signal or utilized as the wobble signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
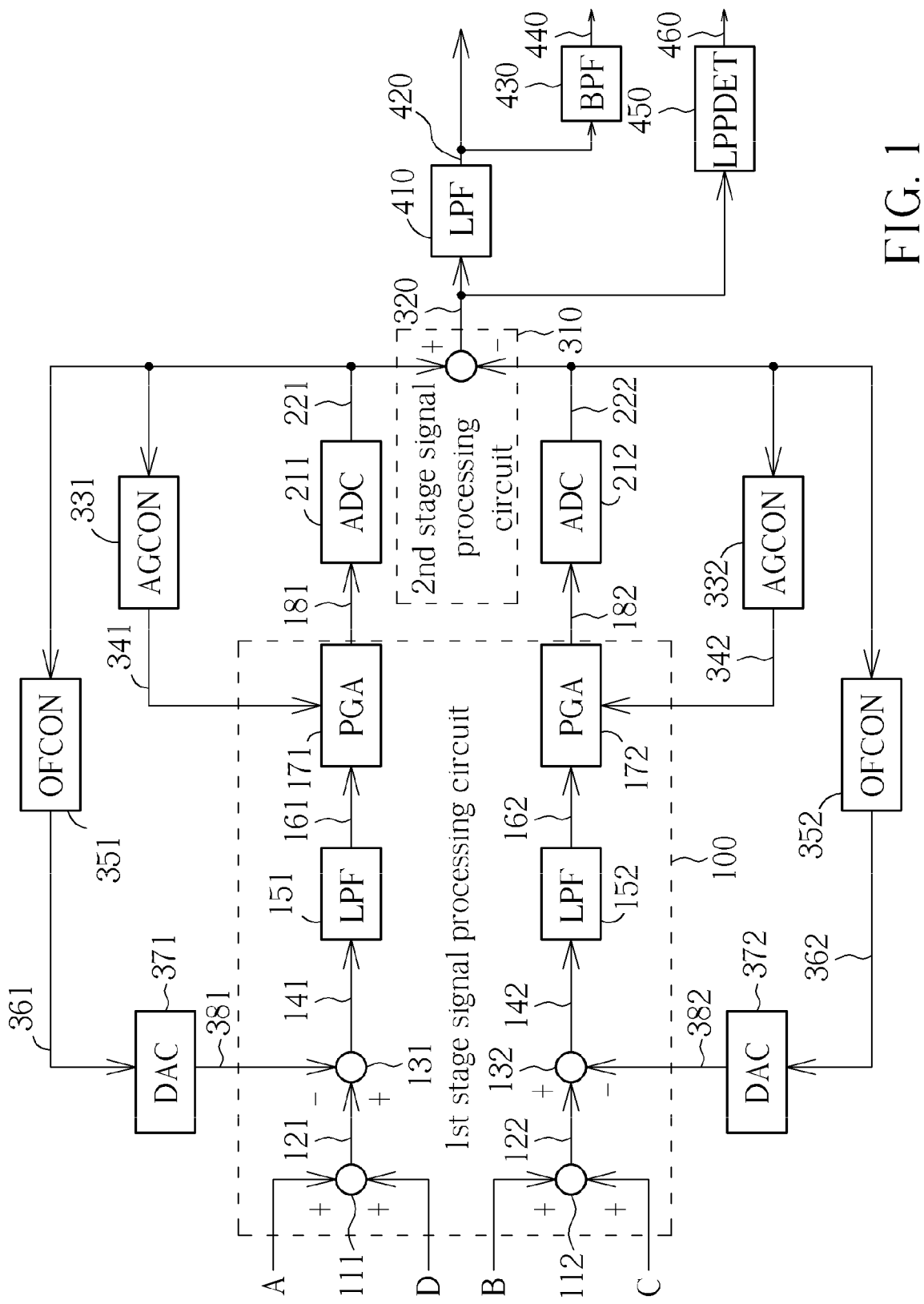
FIG. 1 is a diagram of a device for detecting wobbles on an optical disc according to a first embodiment of the present invention.

Please refer to FIG. 1, which illustrates a diagram of a device for detecting wobbles on an optical disc according to a first embodiment of the present invention, where the device can be utilized for generating a wobble signal according to a plurality of detection signals A, D, B, and C of a split photodetector (PD) of an optical pickup unit (OPU). The device of this embodiment is an optical storage device. This is for illustrative purposes only, and is not meant to be a limitation of the present invention. According to a variation of this embodiment, the device can be a portion of the optical storage device mentioned above, such as a control circuit within the optical storage device.

As shown in FIG. 1, the device comprises a plurality of arithmetic units comprising a first arithmetic unit 111 and a second arithmetic unit 112. In general, the plurality of arithmetic units can be illustrated with circles having the positive sign "+" and/or the negative sign "−" on their inputs as will be appreciated by those skilled in the art.

In addition, the device further comprises a plurality of low pass filters (LPFs) 151 and 152, a plurality of programmable gain amplifiers (PGAs) 171 and 172, at least one analog-to-digital converter (ADC) such as two ADCs 211 or 212, and a plurality of digital automatic gain control (AGC) circuits 331 and 332 (labeled "AGCON" in the functional blocks thereof). The device further comprises a plurality of offset reduction circuits, such as a first offset reduction circuit comprising a digital offset control circuit 351 (labeled "OFCON" in the functional block thereof), a digital-to-analog converter (DAC) 371 and an arithmetic unit 131. Moreover, a second offset reduction circuit is also included in the device, the second offset reduction circuit comprises a digital offset control circuit 352 (labeled "OFCON" in the functional block thereof), a DAC 372 and an arithmetic unit 132. The device further comprises a LPF 410 connected to a specific arithmetic unit 310 of the arithmetic units mentioned above, a band pass filter (BPF) 430, and a land pre-pit detection circuit (LPPDET) 450.

Please note that the circuitry 100 labeled "1$^{st}$ stage signal processing circuit" is implemented with analog components, and can be referred to as an analog signal processing circuit according to a first aspect of the present invention. In addition, the specific arithmetic unit 310 labeled "2$^{nd}$ stage signal processing circuit", the digital AGC circuits 331 and 332 (both labeled "AGCON"), and the digital offset control circuits 351 and 352 (both labeled "OFCON") are implemented with digital processing circuits. Thus, the specific arithmetic unit 310, the digital AGC circuits 331 and 332, the digital offset control circuits 351 and 352 can be referred to as a digital signal processing circuit according to the first aspect. This is for illustrative purposes only, and is not meant to be a limitation of the present invention. According to a second aspect of the present invention, some prior stages of the specific arithmetic unit 310 can be referred to as a pair of wobble processing modules, such as a first wobble processing module and a second wobble processing module.

More particularly, the first wobble processing module comprises an analog signal processing circuit comprising the LPF 151 and the PGA 171, and further comprises a digital signal processing circuit comprising the digital AGC circuit 331, and the digital offset control circuit 351. Similarly, the second wobble processing module comprises an analog signal processing circuit comprising the LPF 152 and the PGA 172, and further comprises a digital signal processing circuit comprising the digital AGC circuit 332, the digital offset control circuit 352.

Operations of analog signal processing performed on the detection signals A, D, B, and C by the circuitry 100 are described in details as follows.

Figure 2:
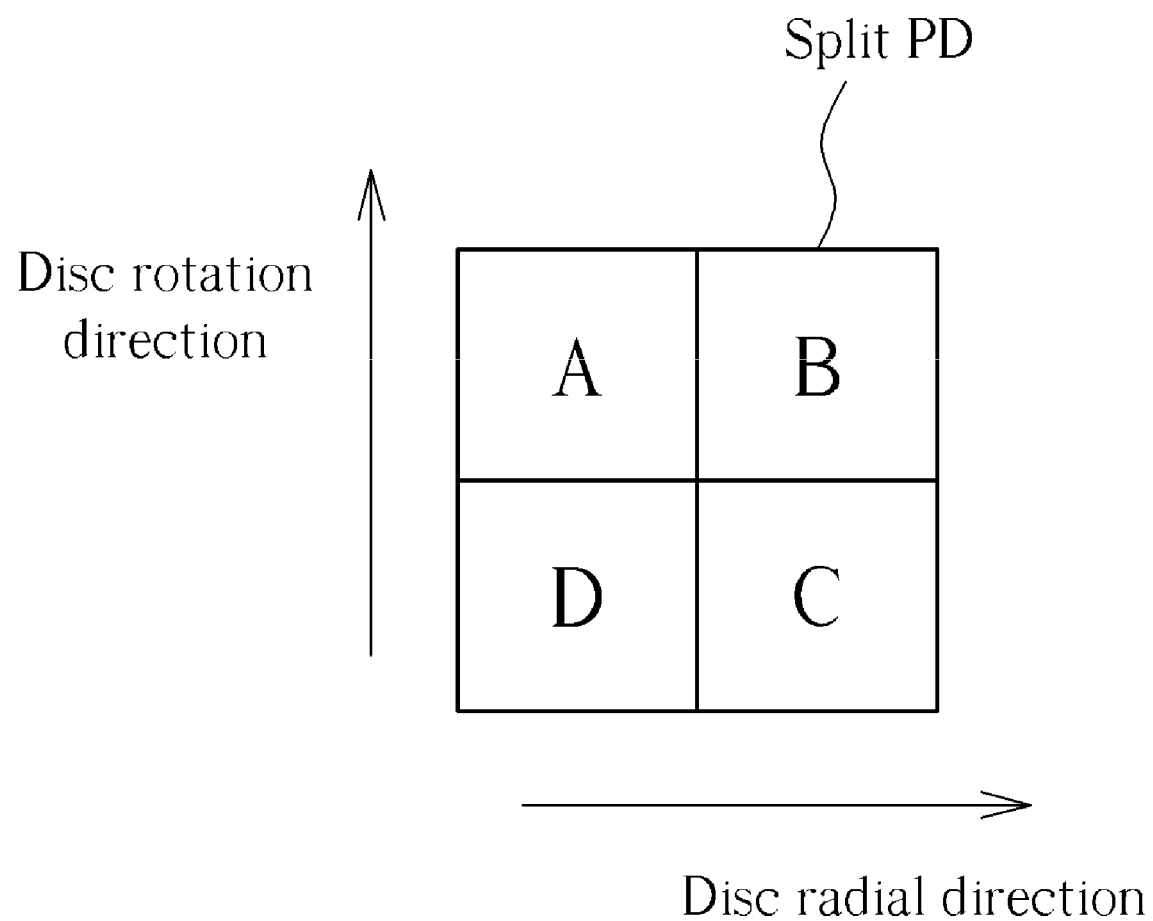
FIG. 2 illustrates an example of the detection arrangement of a split photo-detector (PD) of an optical pickup unit (OPU) according to the embodiment shown in FIG. 1.

As shown in FIG. 1, the first arithmetic unit 111 is arranged to sum up the detection signals A and D to generate a first composite detection signal 121, while the second arithmetic unit 112 is arranged to sum up another two detection signals B, and C to generate a second composite detection signal 122. By using the arithmetic units 131 and 132, the reduction circuits of this embodiment are arranged to perform offset reduction on the composite detection signals 121 and 122 to generate a plurality of offset-reduction signals 141 and 142, where an example of the detection arrangement of the split PD is illustrated in FIG. 2.

As a result of the aforementioned offset reduction, the DC components of the composite detection signals 121 and 122 are removed. This is for illustrative purposes only, and is not meant to be a limitation of the present invention. According to a variation of this embodiment, the reduction circuits are arranged to directly perform offset reduction on the detection signals A, D, B, and C. Please note that the offset-reduction signals 141 and 142 can be referred to as offset-reduced composite detection signals.

The LPFs 151 and 152 are arranged to reduce noise components of the first and the second composite detection signals to generate a plurality of filtered results 161 and 162. More particularly, the LPFs 151 and 152 are arranged to perform low pass filtering on the offset-reduction signals 141 and 142 to generate the filtered results 161 and 162. As a result, the noise components of the offset-reduction signals 141 and 142 are removed. Please note that the filtered results 161 and 162 can be referred to as noise-reduced composite detection signals.

In addition, the PGAs 171 and 172 are arranged to adjust amplitudes of the noise-reduced composite detection signals 161 and 162 respectively output from the LPFs 151 and 152, so that the adjusted composite detection signals have the same amplitude. More particularly, the PGAs 171 and 172 are arranged to adjust respective gains of the filtered results 161 and 162 to generate a plurality of PGA output signals 181 and 182, where the PGA output signals 181 and 182 are utilized as output signals of the circuitry 100.

The pair of ADCs 211 and 212 are arranged to perform analog-to-digital conversion on the PGA output signals 181 and 182 to generate a plurality of digital values 221 and 222. Thus, the ADCs 211 and 212 digitalize the output signals of the circuitry 100 to generate the digital values 221 and 222.

Operations of digital signal processing performed on the digital values by the digital components are described in details as follows.

As shown in FIG. 1, the digital AGC circuits 331 and 332 are arranged to control the PGAs 171 and 172 of the circuitry 100 according to the digital values 221 and 222 by utilizing AGC control signals 341 and 342, respectively. As a result, the amplitudes of the filtered results 161 and 162 can be dynamically adjusted. Additionally, the specific arithmetic unit 310 (labeled "2$^{nd}$ stage signal processing circuit") is arranged to generate an arithmetic output 320 according to the digital values 221 and 222, where the arithmetic output 320 is utilized for performing wobble detection. For example, the arithmetic output 320 can be utilized for generating the wobble signal. In another example, the arithmetic output 320 can be utilized as the wobble signal.

The digital offset control circuit 351 is arranged to generate an offset control signal 361 according to the digital value 221. The DAC 371 is arranged to perform digital-to-analog conversion on the offset control signal 361 to generate an analog value 381, and the arithmetic unit 131 is arranged to cancel an offset of the composite detection signal 121 according to the analog value 381. This is for illustrative purposes only, and is not meant to be a limitation of the present invention. According to a variation of this embodiment, the arithmetic unit 131 is arranged to cancel an offset of one of the detection signals A and D according to the analog value 381.

Similarly, the digital offset control circuit 352 is arranged to generate an offset control signal 362 according to the digital value 222. The DAC 372 is arranged to perform digital-to-analog conversion on the offset control signal 362 to generate an analog value 382, and the arithmetic unit 132 is arranged to cancel an offset of the composite detection signal 122 according to the analog value 382. This is for illustrative purposes only, and is not meant to be a limitation of the present invention. According to a variation of this embodiment, the arithmetic unit 132 is arranged to cancel an offset of one of the detection signals B, and C according to the analog value 382.

According to the first embodiment, the digital values comprise two digital values 221 and 222, and the offset reduction circuits are arranged to perform offset reduction on the composite detection signals 121 and 122. The arithmetic units of this embodiment comprise the first arithmetic unit 111 arranged to sum up two of the detection signals (e.g. the detection signals A and D) to generate the composite detection signal 121, and further comprise the second arithmetic unit 112 arranged to sum up another two of the detection signals (e.g. the detection signals B and C) to generate the composite detection signal 122, where the specific arithmetic unit 310 (labeled "$2^{nd}$ stage signal processing circuit") calculates a difference between the two digital values 221 and 222 to generate the arithmetic output 320. This is for illustrative purposes only, and is not meant to be a limitation of the present invention. According to a variation of this embodiment, the arithmetic units comprise a first arithmetic unit arranged to calculate a difference between two of the detection signals, and further comprise a second arithmetic unit arranged to calculate a difference between another two of the detection signals, where the specific arithmetic unit sums up the two digital values 221 and 222 to generate the arithmetic output 320.

Regarding the latter stages of the specific arithmetic unit 310, some implementation details of the first embodiment are further explained as follows.

As the arithmetic output 320 carries the wobble information recorded on the optical disc, the arithmetic output 320 can be further processed to extract the wobble information. In this embodiment, the LPF 410 is arranged to filter out noise in the arithmetic output 320 to generate an intermediate signal 420 utilized for extracting phase modulated address information. In addition, the BPF 430 is arranged to filter the intermediate signal 420 to generate an output signal 440 utilized for extracting channel bit clock information. Additionally, the land pre-pit detection circuit 450 (labeled "LPPDET") is arranged to decode land pre-pit address information according to the arithmetic output 320 to generate a land pre-pit detection signal 460.

According to the first embodiment, a portion of the device, such as the prior stages of the specific arithmetic unit 310, can be logically divided into two wobble processing modules (e.g. the upper half of the prior stages and the lower half of the prior stages), each of which comprises one of the LPFs 151 and 152, one of the PGAs 171 and 172, one of the ADCs 211 and 212, and one of the digital AGC circuits 331 and 332. This is for illustrative purposes only, and is not meant to be a limitation of the present invention. According to a variation of this embodiment, a portion of the device is logically divided into more than two wobble processing modules. According to another variation of this embodiment, each of the logically divided wobble processing modules of the device may comprise at least one time-divisionally shared ADC, for example, an ADC that is shared time-divisionally.

In practice, the ADCs 211 and 212 are respectively the next stages of the PGAs 171 and 172, and therefore the detection operations of the device can be digitized. For example, the digital AGC circuits 331 and 332 (both labeled "AGCON") are designed and implemented with digital processing circuits.

Figure 3:
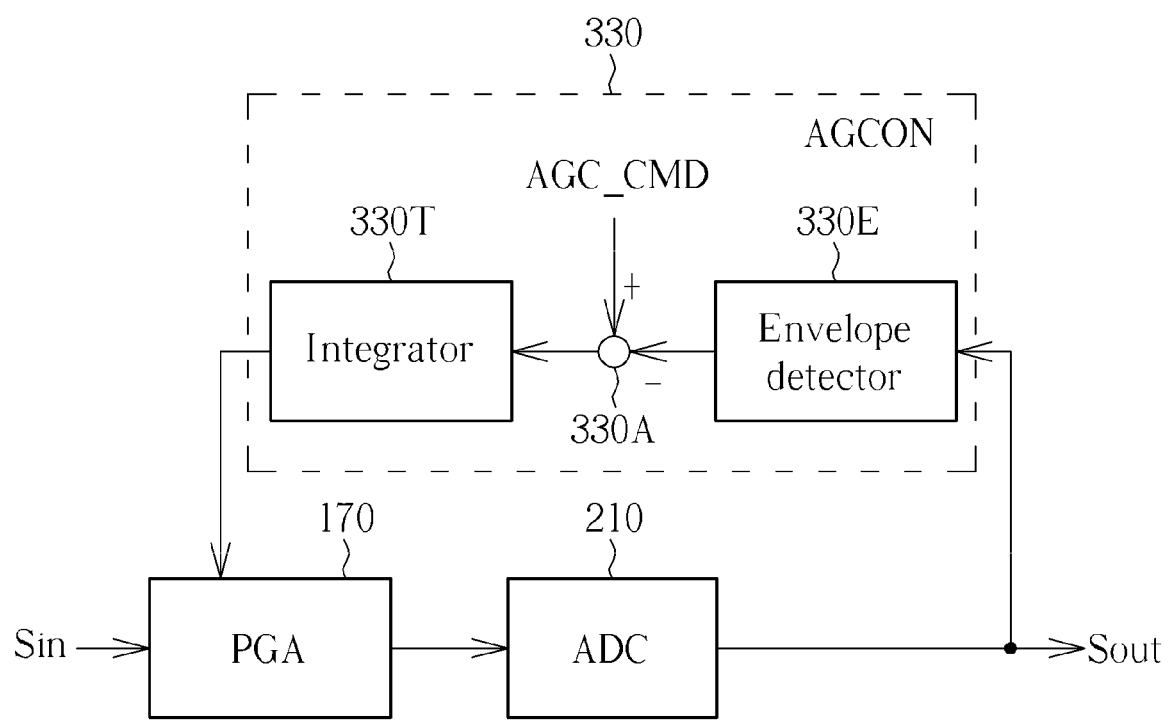
FIG. 3 and FIG. 4 illustrate some implementation details of the device shown in FIG. 1 according to one embodiment of the present invention.
Figure 4:
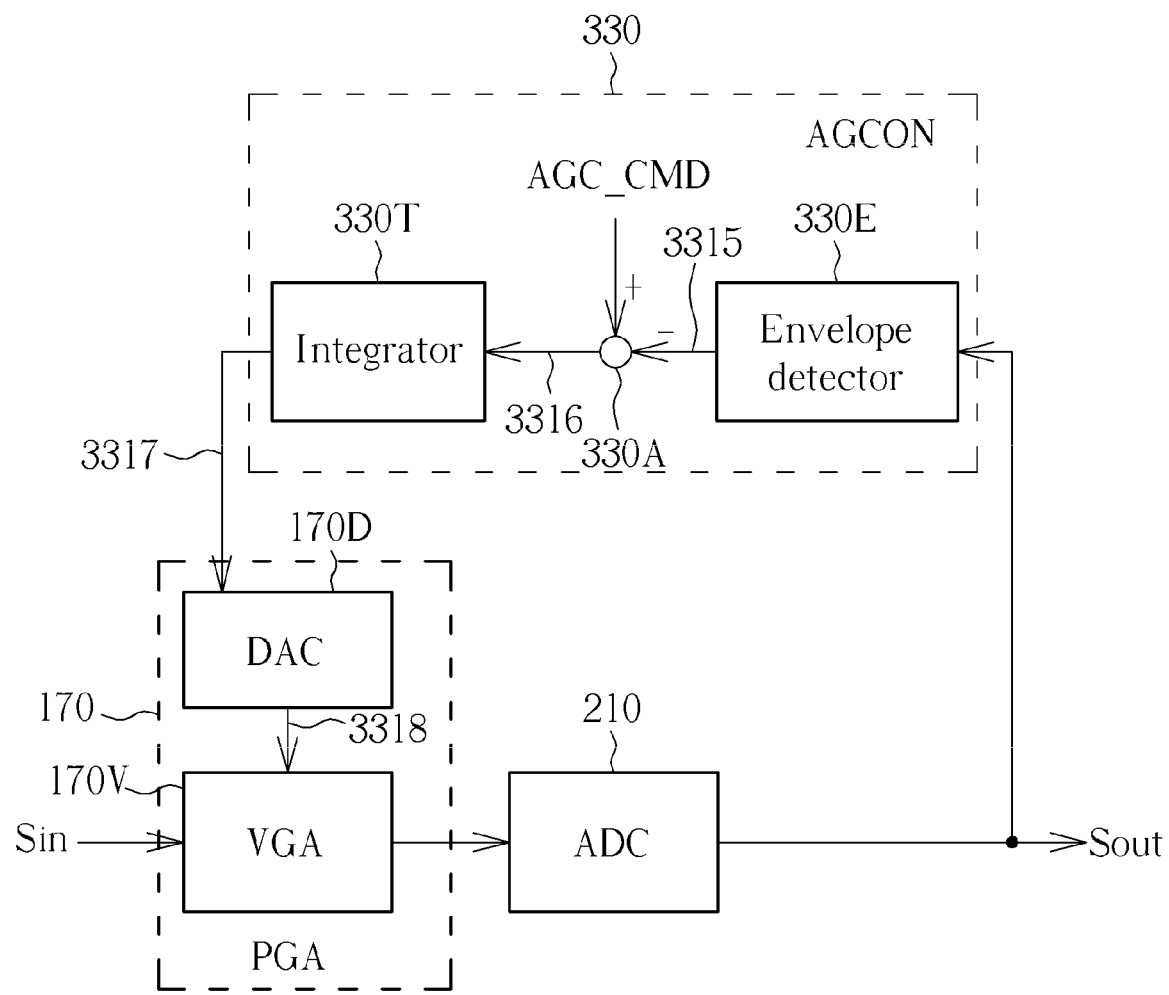

FIG. 3 and FIG. 4 illustrate some implementation details of the device shown in FIG. 1 according to one embodiment of the present invention. The digital AGC circuit 330 (labeled "AGCON") represents the digital AGC circuits 331 and 332 shown in FIG. 1, the PGA 170 represents the associated PGAs 171 and 172 shown in FIG. 1, and the ADC 210 represents the associated ADCs 211 and 212 shown in FIG. 1. The input signal Sin of the PGA 170 represents the input signals of the associated PGAs 171 and 172 (e.g. the filtered results 161 and 162), and the output signal Sout represents the output signals of the associated ADCs 211 and 212 (e.g. the digital values 221 and 222).

As shown in FIG. 3, the digital AGC circuit 330 comprises an integrator 330T and an envelope detector 330E, and further comprises an arithmetic unit 330A inserted between the integrator 330T and the envelope detector 330E, where an AGC command AGC_CMD is applied by the digital AGC circuit 330 through the arithmetic unit 330A. As the envelope detector 330E is designed and implemented with digital processing circuits, there is no non-ideal characteristic such as those in analog circuits (e.g. circuit offsets), and thus the digital AGC circuit 330 is more accurate.

As illustrated in FIG. 4, the PGA 170 comprises a DAC 170D and a voltage gain amplifier (VGA) 170V. The DAC 170D receives an integrator output 3317 from the integrator, where the integrator output 3317 represents the AGC control signals 341 and 342 shown in FIG. 1. The integrator output 3317 is explained as follows.

The envelope detector 330E generates an envelope detection output 3315, and the arithmetic unit 330A shown in FIG. 4 calculates a difference 3316 between the envelope detection output 3315 and the AGC command AGC_CMD, and sends the difference 3316 into the integrator 330T. The integrator 330T receives the difference 3316 and generates the integrator output 3317 by integrating the difference 3316 with respect to time. As a result, the integrator output 3317 is an integrated result of the difference 3316 between the envelope detection output 3315 and the AGC command AGC_CMD with respect to time. Please note that the envelope detector 330E and the integrator 330T are implemented with digital processing circuits instead of analog components, and the chip area required for implementing the above operations is therefore smaller than the related art.

The DAC 170D performs digital-to-analog conversion on the integrator output 3317 to generate an analog value 3318 for controlling the VGA 170V, where the VGA 170V adjusts the gain of the input signal Sin. As the analog value 3318 varies in accordance with the integrator output 3317, the gain of the input signal Sin is dynamically adjusted.

In contrast to the related art, the present invention device and the associated method thereof do not require large component area, such as analog AGC circuits and analog filters (e.g. analog LPFs and analog BPFs). By applying the present invention, the chip area is greatly decreased, and high performance can be achieved.

It is another advantage of the present invention that maintaining the balance between different VGAs used in the device is not required. Therefore, the quality of the wobble detection can be improved without side effects.

Figure 5:
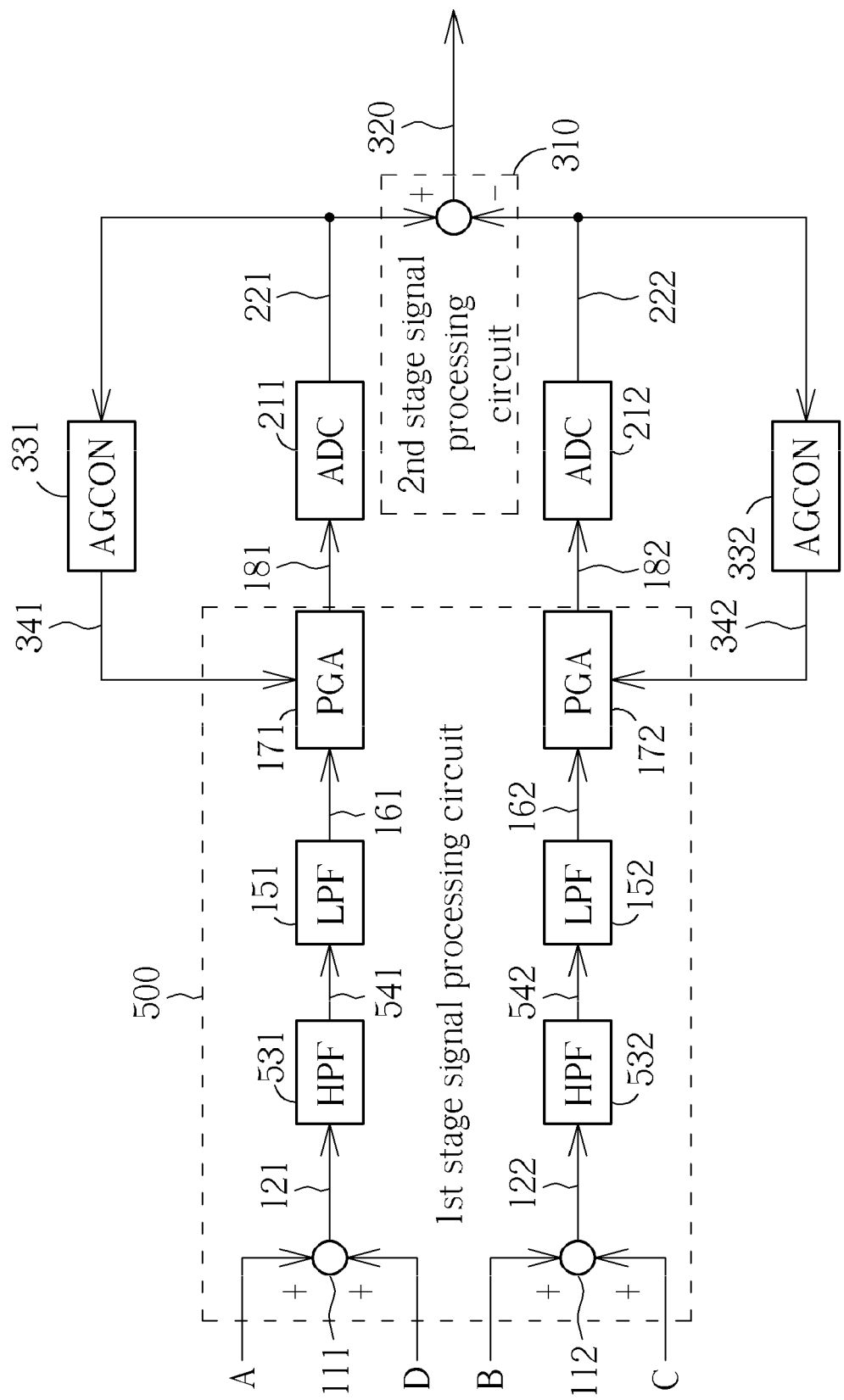
FIG. 5 is a diagram of a device for detecting wobbles on an optical disc according to a second embodiment of the present invention.

FIG. 5 is a diagram of a device for detecting wobbles on an optical disc according to a second embodiment of the present invention, where this embodiment is a variation of the embodiment shown in FIG. 1. The offset reduction circuits of this embodiment is implemented within analog components, and is within the circuitry 500 labeled "1$^{st}$ stage signal processing circuit".

According to this embodiment, each offset reduction circuit comprises a high pass filter (HPF) arranged to perform high pass filtering on one of the composite detection signals. As shown in FIG. 5, the first offset reduction circuit of this embodiment comprises an HPF 531 arranged to perform high pass filtering on the composite detection signal 121 to generate an offset-reduction signal 541 as a replacement of the offset-reduction signal 141, and the second offset reduction circuit of this embodiment comprises an HPF 532 arranged to perform high pass filtering on the composite detection signal 122 to generate an offset-reduction signal 542 as a replacement of the offset-reduction signal 142. This is for illustrative purposes only, and is not meant to be a limitation of the present invention. According to a variation of this embodiment, each offset reduction circuit comprises an HPF arranged to perform high pass filtering on one of the detection signals A, D, B, and C.

According to this embodiment, a portion of the device, such as the prior stages of the specific arithmetic unit 310 (labeled "2$^{nd}$ stage signal processing circuit"), can be logically divided into two wobble processing modules (e.g. the upper half of the prior stages and the lower half of the prior stages), each of which comprises one of the HPFs 531 and 532, one of the LPFs 151 and 152, one of the PGAs 171 and 172, one of the ADCs 211 and 212, and one of the digital AGC circuits 331 and 332. Similar descriptions for this embodiment are not repeated in detail here.

Figure 6:
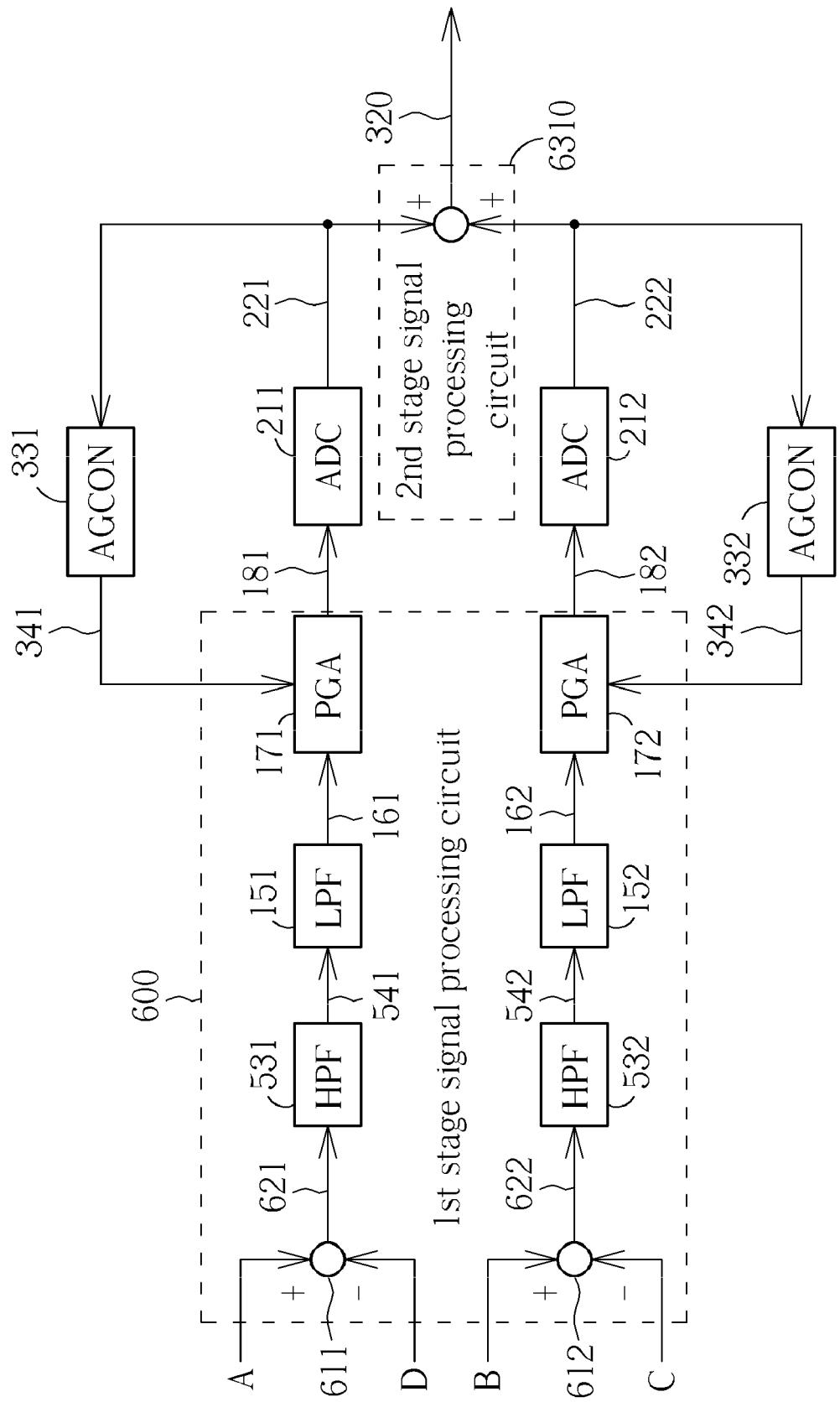
FIG. 6 is a diagram of a device for detecting wobbles on an optical disc according to a third embodiment of the present invention.

FIG. 6 is a diagram of a device for detecting wobbles on an optical disc according to a third embodiment of the present invention, where this embodiment is also a variation of the embodiment shown in FIG. 1, and is a variation of the embodiment shown in FIG. 5. According to this embodiment, the arithmetic units comprise a first arithmetic unit 611 arranged to calculate a difference between two of the detection signals (e.g. the detection signals A and D), and further comprise a second arithmetic unit 612 arranged to calculate a difference between another two of the detection signals (e.g. the detection signals B and C). The first arithmetic unit 611 and the second arithmetic unit 612 of the circuitry 600 labeled "1$^{st}$ stage signal processing circuit" respectively replace the first arithmetic unit 111 and the second arithmetic unit 112 mentioned above.

More specifically, the first arithmetic unit 611 calculates the difference 621 as a representative of the composite detection signal 121, where the HPF 531 performs high pass filtering on the difference 621 to generate the offset-reduction signal 541. In addition, the second arithmetic unit 612 calculates the difference 622 as a representative of the composite detection signal 122, where the HPF 532 performs high pass filtering on the difference 622 to generate the offset-reduction signal 542. Additionally, the specific arithmetic unit 6310 (labeled "2$^{nd}$ stage signal processing circuit") replaces the specific arithmetic unit 310, and sums up the two digital values 221 and 222 to generate the arithmetic output 320. Similar descriptions for this embodiment are not repeated in detail here.

Figure 7:
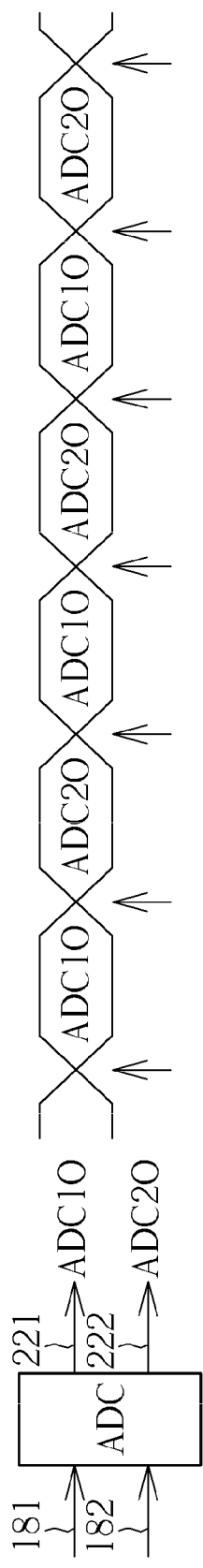
FIG. 7 illustrates an analog-to-digital converter (ADC) utilized in variations of some embodiments of the present invention.
Figure 7:
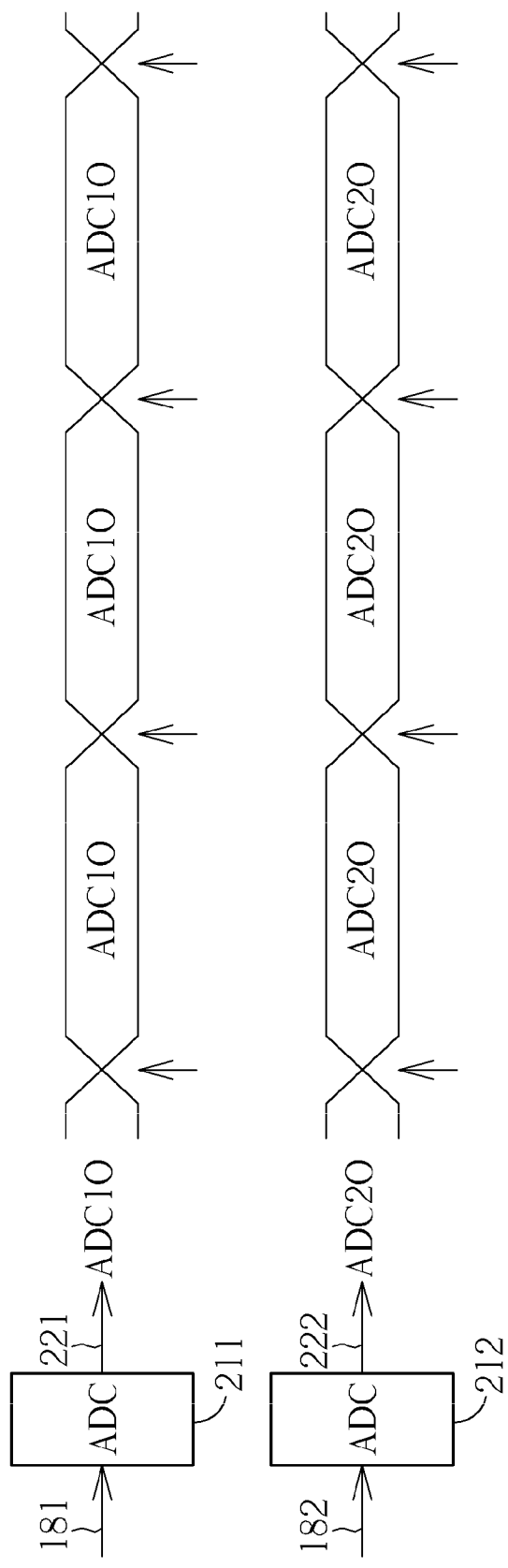

FIG. 7 illustrates an ADC utilized in variations of some embodiments of the present invention (e.g. some of the embodiments mentioned above), where the ADC is designed to work at a sampling rate which doubles that of the ADCs 211 and 212 mentioned above, and is utilized for replacing the ADCs 211 and 212. According to a variation of the first embodiment, the second embodiment, and the third embodiment respectively, the ADC with the double sampling rate can be utilized for replacing the ADCs 211 and 212 shown in FIG. 1, FIG. 5, and FIG. 6 respectively.

The sampling points of the ADC with the double sampling rate are illustrated on the upper right of FIG. 7 for better comprehension, and the ADCs 211 and 212 and the sampling points thereof are illustrated below for comparison. As shown in FIG. 7, the ADC with the double sampling rate samples the PGA output signals 181 and 182 with a time-interleaving scheme and outputs the two digital values 221 and 222, respectively. Here, notations ADC1O and ADC2O are respectively utilized for representing the information corresponding to the two digital values 221 and 222. This is for illustrative purposes only, and is not meant to be a limitation of the present invention. Please note that the information ADC1O and the information ADC2O can be respectively varied with respect to time.

According to each of the variations illustrated with FIG. 7, a portion of the device, such as the prior stages of the specific arithmetic unit shown in FIG. 1, FIG. 5 or FIG. 6 (i.e. the specific arithmetic unit 310 or the specific arithmetic unit 6310), can be logically divided into two wobble processing modules, each of which comprises one of the LPFs 151 and 152, one of the PGAs 171 and 172, the ADC that is shared time-divisionally (i.e. the ADC with the double sampling rate), and one of the digital AGC circuits 331 and 332. Similar descriptions for these variations are not repeated in detail here.

Figure 8:
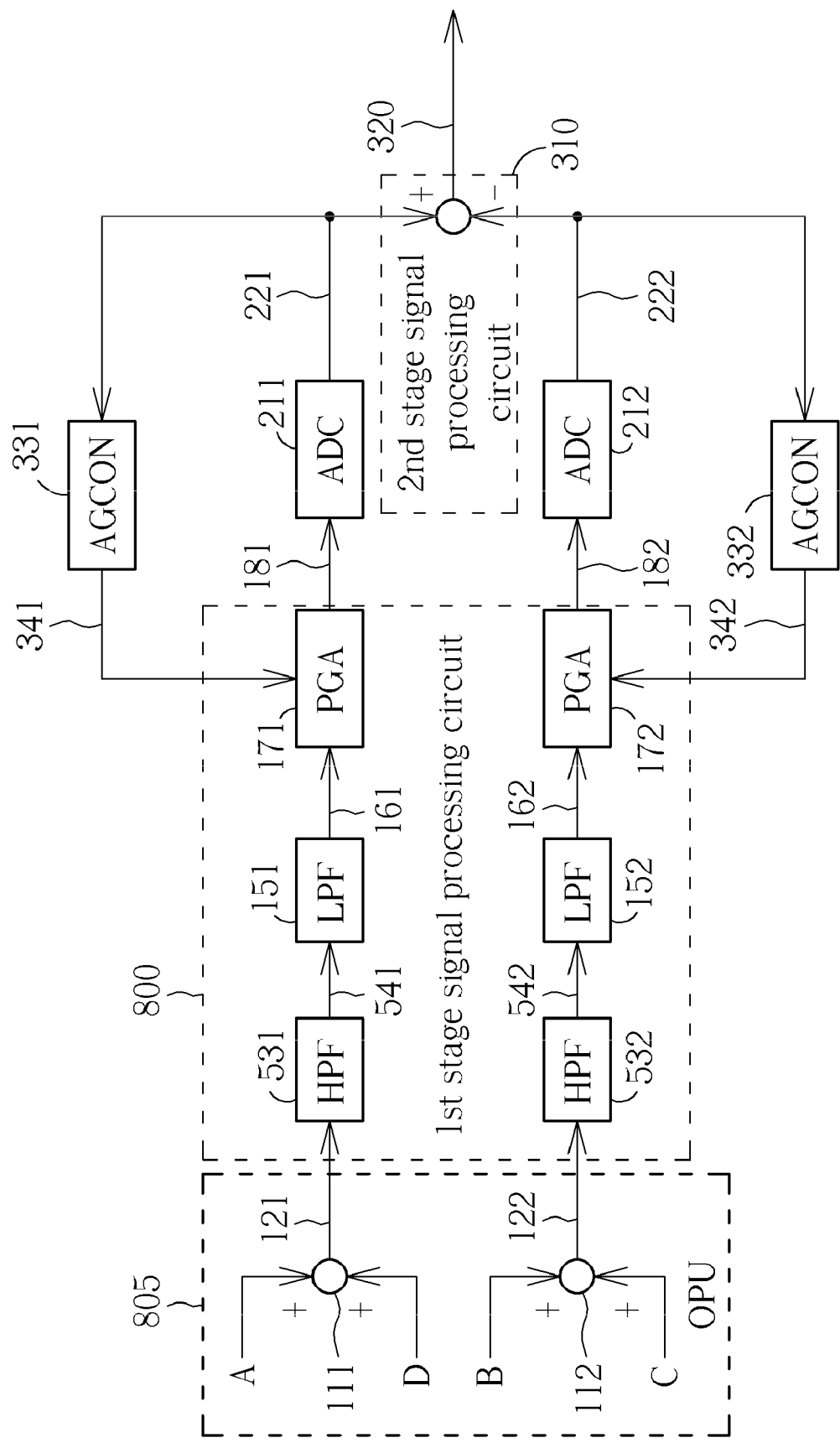
FIG. 8 is a diagram of a device for detecting wobbles on an optical disc according to a fourth embodiment of the present invention.

FIG. 8 is a diagram of a device for detecting wobbles on an optical disc according to a fourth embodiment of the present invention, where this embodiment is also a variation of the embodiment shown in FIG. 1, and is also a variation of the embodiment shown in FIG. 5. According to this embodiment, the first arithmetic unit 111 generating the composite detection signal 121 and the second arithmetic unit 112 generating the composite detection signal 122 is positioned in the OPU 805, and the other components of the circuitry 500 are positioned in the circuitry 800 labeled "1$^{st}$ stage signal processing circuit". Similar descriptions for this embodiment are not repeated in detail here.

Figure 9:
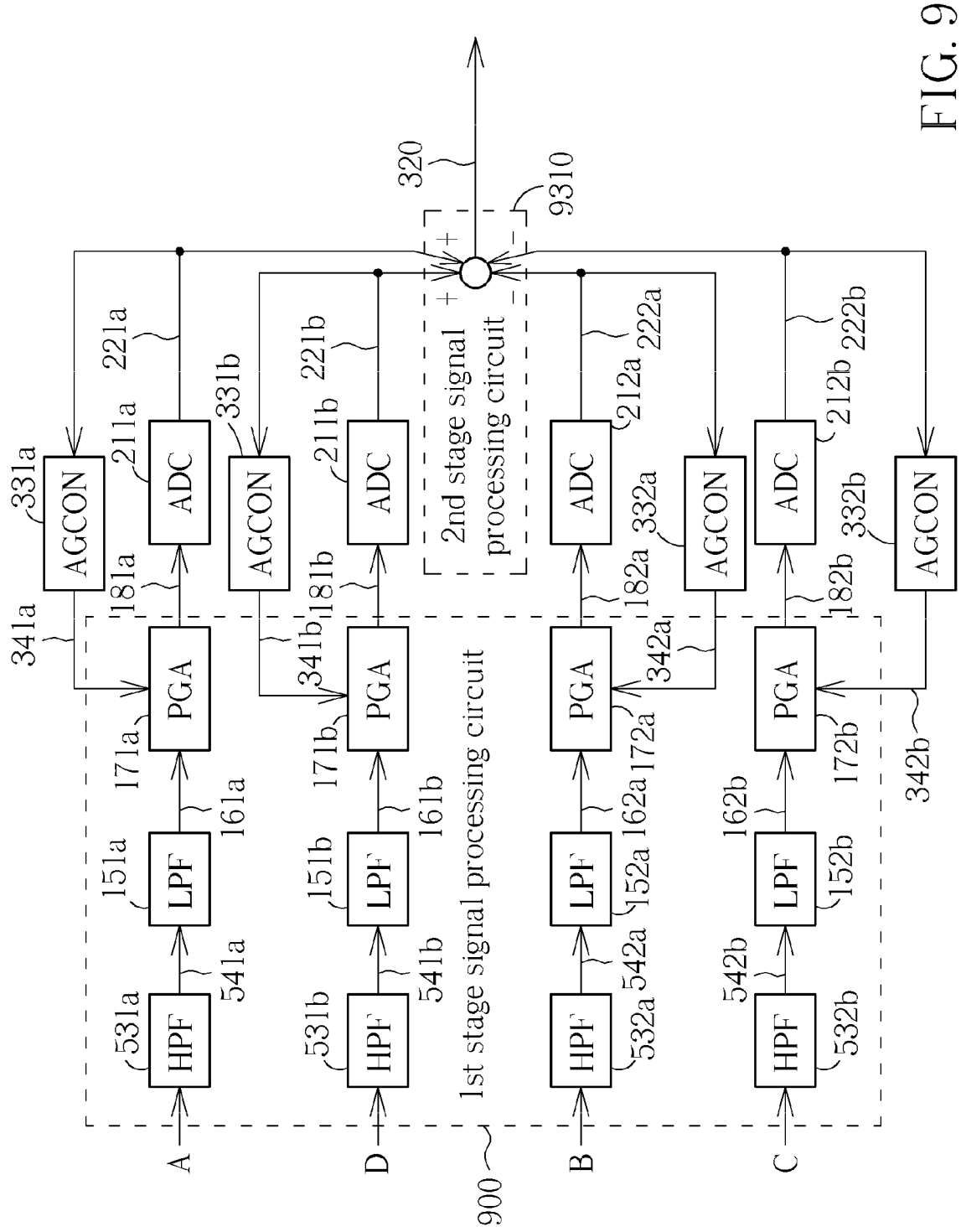
FIG. 9 is a diagram of a device for detecting wobbles on an optical disc according to a fifth embodiment of the present invention.

FIG. 9 is a diagram of a device for detecting wobbles on an optical disc according to a fifth embodiment of the present invention, where this embodiment is also a variation of the embodiment shown in FIG. 1, and is also a variation of the embodiment shown in FIG. 5. More particularly, the circuitry 900 labeled "1$^{st}$ stage signal processing circuit" replaces the circuitry 500 shown in FIG. 5, and the specific arithmetic unit 9310 labeled "2$^{nd}$ stage signal processing circuit" replaces the specific arithmetic unit 310 mentioned above.

According to this embodiment, a portion of the device, such as the prior stages of the specific arithmetic unit 9310, can be logically divided into four wobble processing modules (e.g. the four rows of components of the prior stages), each of which comprises one of the HPFs 531a, 531b, 532a and 532b, one of the LPFs 151a, 151b, 152a and 152b, one of the PGAs 171a, 171b, 172a and 172b, one of the ADCs 211a, 211b, 212$a$ and 212$b$, and one of the digital AGC circuits 331$a$, 331$b$, 332$a$ and 332$b$ (labeled "AGCON").

Comparing this embodiment to that shown in FIG. 5, the number of wobble processing modules has been extended to four, and there are also four sets of signals for the four wobble processing modules of this embodiment. For example, the two offset-reduction signals 541 and 542 are extended to the four offset-reduction signals 541$a$, 541$b$, 542$a$ and 542$b$; the two filtered results 161 and 162 are extended to the four filtered results 161$a$, 161$b$, 162$a$ and 162$b$; the two PGA output signals 181 and 182 are extended to the four PGA output signals 181$a$, 181$b$, 182$a$ and 182$b$; the two digital values 221 and 222 are extended to the four digital values 221$a$, 221$b$, 222$a$ and 222$b$, and the two AGC control signals 341 and 342 are extended to the four AGC control signals 341$a$, 341$b$, 342$a$ and 342$b$.

According to this embodiment, the digital values comprise four digital values (e.g. 221$a$, 221$b$, 222$a$ and 222$b$), and the offset reduction circuits (e.g. the HPFs 531$a$, 531$b$, 532$a$ and 532$b$) are arranged to perform offset reduction on the detection signals A, D, B, and C, where the arithmetic output 320 is equivalent to a difference between a summation of two of the four digital values (e.g. the two digital values 221$a$ and 221$b$) and a summation of the other two of the four digital values (e.g. the two digital values 222$a$ and 222$b$). Similar descriptions for this embodiment are not repeated in detail here.

Figure 10:
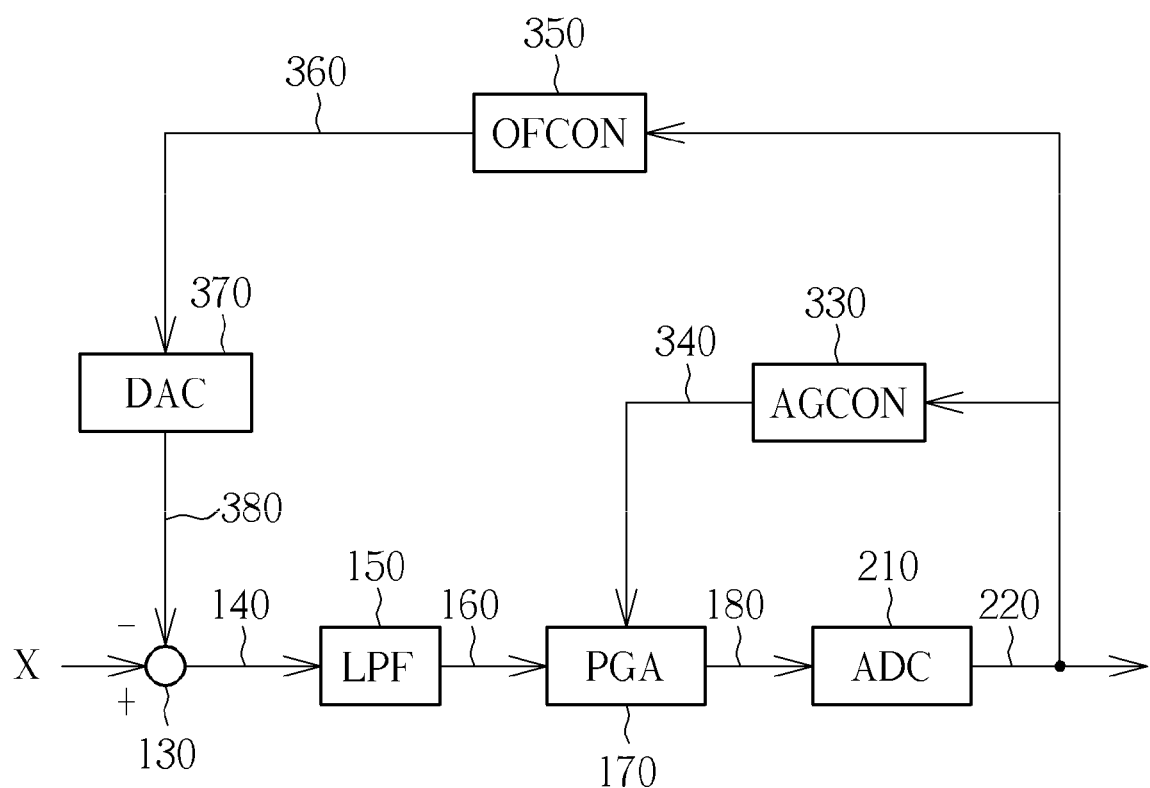
FIG. 10 illustrates a wobble processing module utilized in a variation of the fifth embodiment.

FIG. 10 illustrates a wobble processing module utilized in a variation of the fifth embodiment in FIG. 9. For example, the LPF 150, the PGA 170, the ADC 210, and the digital AGC circuit 330 (labeled "AGCON") respectively represents the $i^{th}$ LPF of the LPFs 151$a$, 151$b$, 152$a$ and 152$b$, the $i^{th}$ PGA of the PGAs 171$a$, 171$b$, 172$a$ and 172$b$, the $i^{th}$ ADC of the ADCs 211$a$, 211$b$, 212$a$ and 212$b$, and the $i^{th}$ digital AGC circuit of the digital AGC circuits 331$a$, 331$b$, 332$a$ and 332$b$ ($i$=1, 2, 3 or 4), i.e. the components of the $i^{th}$ wobble processing module of the device ($i$=1, 2, 3 or 4), where the $i^{th}$ wobble processing module represents the $i^{th}$ row of components of the prior stages of the specific arithmetic unit 9310 shown in FIG. 9, starting from the uppermost row of components of the prior stages.

In this variation, the aforementioned HPFs 531$a$, 531$b$, 532$a$ and 532$b$ are replaced with offset reduction circuits such as those in the first embodiment. For example, the $i^{th}$ HPF of the HPFs 531$a$, 531$b$, 532$a$ and 532$b$ is replaced with an offset reduction circuit comprising the $i^{th}$ digital offset control circuit of a plurality of digital offset control circuits 351$a$, 351$b$, 352$a$ and 352$b$ (which are simply illustrated with the digital offset control circuit 350 labeled "OFCON"), the $i^{th}$ DAC of a plurality of DACs 371$a$, 371$b$, 372$a$ and 372$b$ (which are simply illustrated with the DAC 370) and the $i^{th}$ arithmetic unit of a plurality of arithmetic units 131$a$, 131$b$, 132$a$ and 132$b$ (which are simply illustrated with the arithmetic unit 130). In a situation where X represents one of the detection signals A, D, B, or C (with $i$=1, 2, 3 or 4, respectively), the offset-reduction signal 140 represents the $i^{th}$ offset-reduction signal of the offset-reduction signals 141$a$, 141$b$, 142$a$ or 142$b$. Thus, the $i^{th}$ offset-reduction signal replaces the $i^{th}$ offset-reduction signal of the four offset-reduction signals 541$a$, 541$b$, 542$a$ and 542$b$ shown in FIG. 9.

As shown in FIG. 10, the $i^{th}$ filtered result of the four filtered results 161$a$, 161$b$, 162$a$ and 162$b$ is labeled as the numeral 160, the $i^{th}$ PGA output signal of the four PGA output signals 181$a$, 181$b$, 182$a$ and 182$b$ is labeled as the numeral 180, the $i^{th}$ digital value of the four digital values 221$a$, 221$b$, 222$a$ and 222$b$ is labeled as the numeral 220, and the $i^{th}$ AGC control signal of the four AGC control signals 341$a$, 341$b$, 342$a$ and 342$b$ is labeled as the numeral 340. In addition, the $i^{th}$ offset control signal of a plurality of offset control signals 361$a$, 361$b$, 362$a$ and 362$b$ (i.e. the associated offset control signal output by the $i^{th}$ digital offset control circuit of the aforementioned digital offset control circuits 351$a$, 351$b$, 352$a$ and 352$b$) is simply labeled as the numeral 360, and the $i^{th}$ offset control signal of a plurality of offset control signals 381$a$, 381$b$, 382$a$ and 382$b$ (i.e. the associated offset control signal output by the $i^{th}$ DAC of the aforementioned DACs 371$a$, 371$b$, 372$a$ and 372$b$) is simply labeled as the numeral 380. Similar descriptions for this embodiment are not repeated in detail here.

Figure 11:
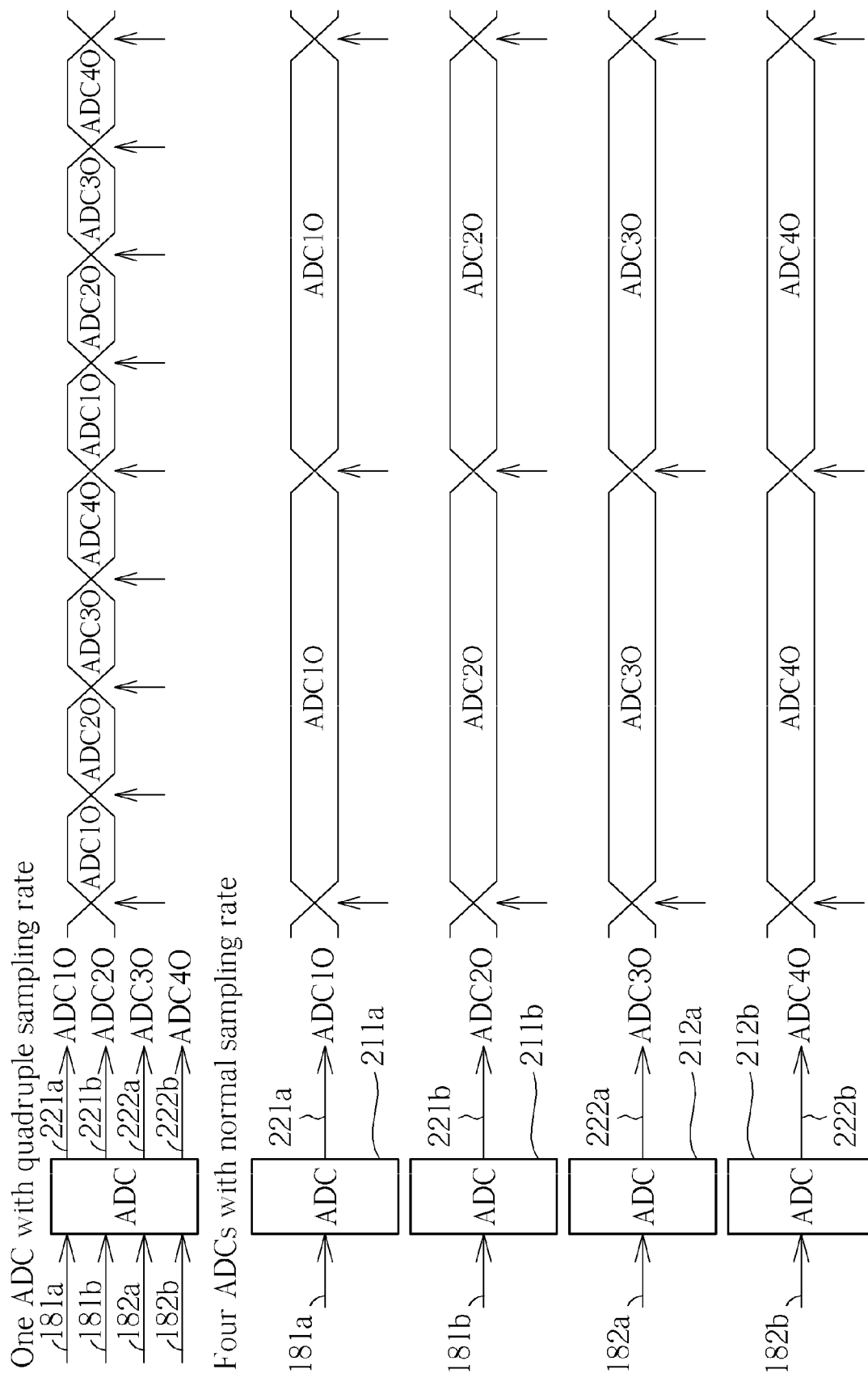
FIG. 11 illustrates an ADC utilized in another variation of the fifth embodiment.

FIG. 11 illustrates an ADC utilized in another variation of the fifth embodiment, where the ADC is designed to work at a sampling rate which quadruples that of the ADCs 211$a$, 211$b$, 212$a$ and 212$b$ shown in FIG. 9, and is utilized for replacing the ADCs 211$a$, 211$b$, 212$a$ and 212$b$.

The sampling points of the ADC with the quadruple sampling rate are illustrated on the upper right of FIG. 11 for better comprehension, and the ADCs 211$a$, 211$b$, 212$a$ and 212$b$ and the sampling points thereof are illustrated below for comparison. As shown in FIG. 11, the ADC with the quadruple sampling rate samples the PGA output signals 181$a$, 181$b$, 182$a$ and 182$b$ with a time-interleaving scheme and outputs the four digital values 221$a$, 221$b$, 222$a$ and 222$b$, respectively. For simplicity, the notations ADC1O, ADC2O, ADC3O and ADC4O of this variation are respectively utilized for representing the information corresponding to the digital values 221$a$ 221$b$, 222$a$ and 222$b$. This is for illustrative purposes only, and is not meant to be a limitation of the present invention. Please note that the information ADC1O, ADC2O, ADC3O, and ADC4O can be respectively varied with respect to time.

According to the variation illustrated with FIG. 11, a portion of the device, such as the prior stages of the specific arithmetic unit 9310 shown in FIG. 9, can be logically divided into four wobble processing modules, each of which comprises one of the HPFs 531$a$, 531$b$, 532$a$ and 532$b$, one of the LPFs 151$a$, 151$b$, 152$a$ and 152$b$, one of the PGAs 171$a$, 171$b$, 172$a$ and 172$b$, the ADC that is shared time-divisionally (i.e. the ADC with the quadruple sampling rate), and one of the digital AGC circuits 331$a$, 331$b$, 332$a$ and 332$b$. Similar descriptions for this variation are not repeated in detail here.

Figure 12:
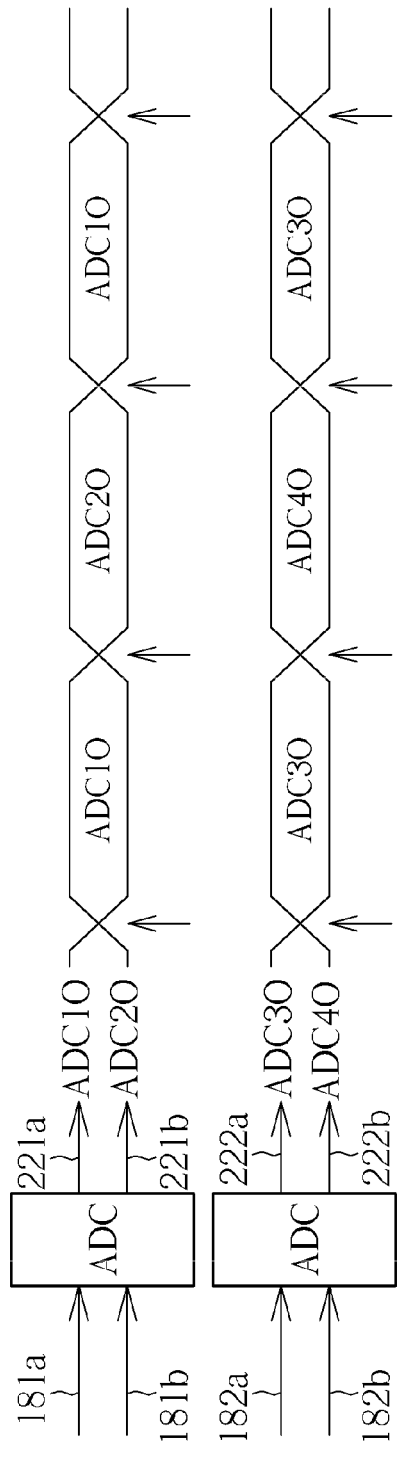
FIG. 12 illustrates two ADCs utilized in another variation of the fifth embodiment.
Figure 12:
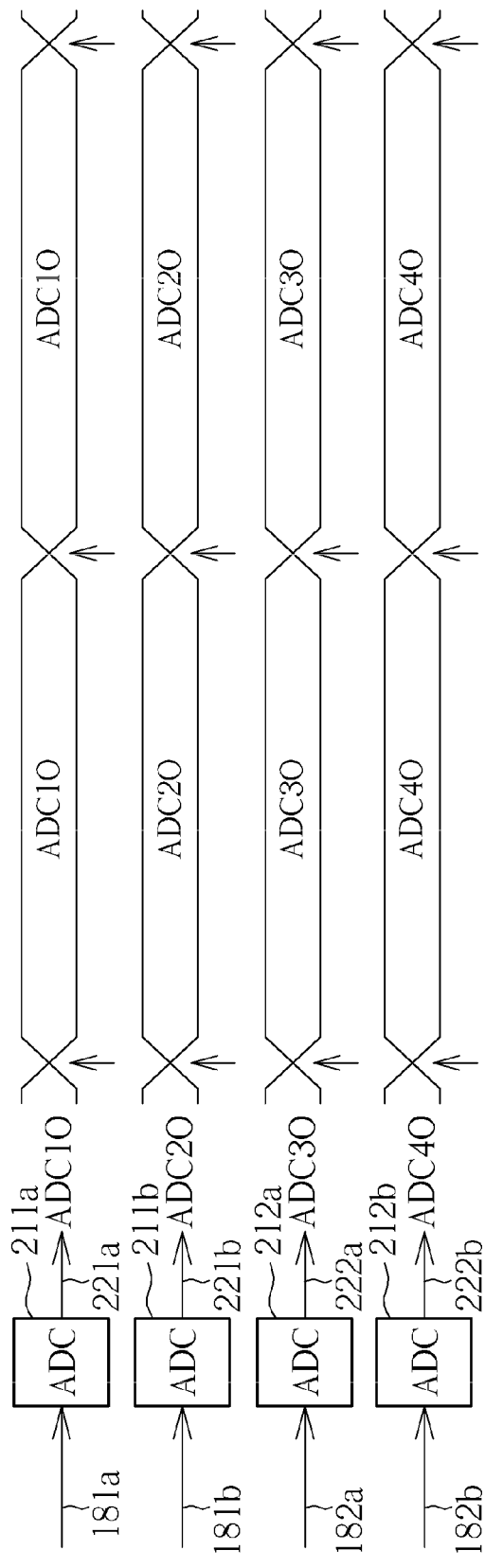

FIG. 12 illustrates two ADCs utilized in another variation of the fifth embodiment, where the two ADCs are designed to work at a sampling rate which doubles that of the ADCs 211$a$, 211$b$, 212$a$ and 212$b$ shown in FIG. 9, and is utilized for replacing the ADCs 211$a$, 211$b$, 212$a$ and 212$b$.

The sampling points of the two ADCs with the double sampling rate are illustrated on the upper right of FIG. 12 for better comprehension, and the ADCs 211$a$, 211$b$, 212$a$ and 212$b$ and the sampling points thereof are illustrated below for comparison. As shown in FIG. 12, the two ADCs with the double sampling rate sample the PGA output signals 181$a$, 181$b$, 182$a$ and 182$b$ with a time-interleaving scheme and output the four digital values 221$a$, 221$b$, 222$a$ and 22$b$, respectively. More particularly, the upper one of the two ADCs with the double sampling rate samples the PGA output signals 181$a$ and 181$b$ with a time-interleaving scheme and outputs the digital values 221$a$ and 221$b$, respectively. In addition, the lower one of the two ADCs with the double sampling rate samples the PGA output signals 182$a$ and 182$b$ with a time-interleaving scheme and outputs the digital values 222$a$ and 222$b$, respectively.

According to the variation illustrated with FIG. 12, a portion of the device, such as the prior stages of the specific arithmetic unit 9310 shown in FIG. 9, can be logically divided into two sub-portions (e.g. the upper half of the prior stages and the lower half of the prior stages), each of which is logically divided into two wobble processing modules. Each of the two ADCs with the double sampling rate is shared time-divisionally between respective wobble processing modules of a corresponding sub-portion of the two sub-portions.

In addition, each wobble processing module comprises one of the HPFs 531*a*, 531*b*, 532*a* and 532*b*, one of the LPFs 151*a*, 151*b*, 152*a* and 152*b*, one of the PGAs 171*a*, 171*b*, 172*a* and 172*b*, one of the two ADCs that is shared time-divisionally (i.e. one of the two ADCs with the double sampling rate), and one of the digital AGC circuits 331*a*, 331*b*, 332*a* and 332*b*. Similar descriptions for this variation are not repeated in detail here.

According to variations of some embodiments of the present invention (e.g. some of the embodiments mentioned above), the ADCs can be implemented with a 1-bit ADC (e.g. a slicer) to reduce related costs, where the functional blocks labeled "PGA" are not necessary. Similar descriptions for these variations are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device for detecting wobbles on an optical disc, the device being utilized for generating a wobble signal according to a plurality of detection signals, the device comprising:
   an analog signal processing circuit arranged to perform analog signal processing on the detection signals to generate a plurality of output signals, wherein the analog signal processing circuit comprises:
      a plurality of arithmetic units arranged to perform a first arithmetic operation on two of the detection signals to generate a first composite detection signal, and arranged to perform the first arithmetic operation on another two of the detection signals to generate a second composite detection signal;
   a pair of analog-to-digital converters (ADCs) arranged to digitalize the output signals to generate a plurality of digital values; and
   a digital signal processing circuit arranged to perform digital signal processing on the digital values and generate an arithmetic output, wherein the digital signal processing circuit performs a second arithmetic operation on the digital values to generate the arithmetic output;
   wherein the device is utilized for detecting wobbles on the optical disc, and the device is utilized for generating the wobble signal according to the plurality of detection signals.

2. The device of claim 1, wherein the analog signal processing circuit comprises:
   a first arithmetic unit, which is one of the plurality of arithmetic units, arranged to sum up the two of the detection signals to generate the first composite detection signal;
   a second arithmetic unit, which is another of the plurality of arithmetic units, arranged to sum up the other two of the detection signals to generate the second composite detection signal;
   a plurality of low pass filters (LPFs) arranged to reduce noise components of the first and the second composite detection signals to generate a plurality of filtered results; and
   a plurality of programmable gain amplifiers/voltage gain amplifiers (PGAs/VGAs) arranged to adjust amplitudes of the first and the second composite detection signals respectively output from the LPFs, so that the adjusted composite detection signals have the same amplitude, wherein the adjusted composite detection signals are utilized as the output signals.

3. The device of claim 2, wherein the digital signal processing circuit comprises:
   a specific arithmetic unit arranged to calculate a difference between the digital values to generate the arithmetic output.

4. The device of claim 1, wherein the analog signal processing circuit comprises:
   a first arithmetic unit, which is one of the plurality of arithmetic units, arranged to calculate a difference between the two of the detection signals to generate the first composite detection signal;
   a second arithmetic unit, which is another of the plurality of arithmetic units, arranged to calculate a difference between the other two of the detection signals to generate the second composite detection signal;
   a plurality of low pass filters (LPFs) arranged to reduce noise components of the first and the second composite detection signals to generate a plurality of filtered results; and
   a plurality of programmable gain amplifiers/voltage gain amplifiers (PGAs/VGAs) arranged to adjust amplitudes of the first and the second composite detection signals respectively output from the LPFs, so that the adjusted composite detection signals have the same amplitude.

5. The device of claim 4, wherein the digital signal processing circuit comprises:
   a specific arithmetic unit arranged to sum up the digital values to generate the arithmetic output.

6. The device of claim 1, wherein the digital signal processing circuit comprises:
   a specific arithmetic unit arranged to generate the arithmetic output according to the digital values; and
   a plurality of digital automatic gain control (AGC) circuits arranged to control the analog signal processing circuit according to the digital values.

7. The device of claim 6, wherein the digital signal processing circuit further comprises:
   a plurality of digital offset control circuits arranged to control the analog signal processing circuit according to the digital values.

8. A method for detecting wobbles on an optical disc, the method being utilized for generating a wobble signal according to a plurality of detection signals of a split photo-detector (PD) of an optical pickup unit (OPU), the method comprising:
   performing analog signal processing on the detection signals to generate a plurality of output signals, wherein the step of performing analog signal processing on the detection signals to generate the plurality of output signals further comprises:
      performing a first arithmetic operation on two of the detection signals to generate a first composite detection signal, and performing the first arithmetic operation on another two of the detection signals to generate a second composite detection signal;
   digitalizing the output signals to generate a plurality of digital values; and performing digital signal processing on the digital values to generate an arithmetic output, wherein the step of performing digital signal processing on the digital values to generate the arithmetic output further comprises:

performing a second arithmetic operation on the digital values to generate the arithmetic output;

wherein the method is utilized for detecting wobbles on the optical disc, and the method is utilized for generating the wobble signal according to the plurality of detection signals of the PD of the OPU.

9. The method of claim 8, wherein the step of performing analog signal processing on the detection signals to generate the plurality of output signals further comprises:

summing up the two of the detection signals to generate the first composite detection signal;

summing up the other two of the detection signals to generate the second composite detection signal;

reducing noise components of the first and the second composite detection signals to generate a plurality of filtered results; and adjusting amplitudes of the first and the second composite detection signals, so that the adjusted composite detection signals have the same amplitude, wherein the adjusted composite detection signals are utilized as the output signals.

10. The method of claim 9, wherein the step of performing digital signal processing on the digital values and generating the arithmetic output further comprises:

calculating a difference between the digital values to generate the arithmetic output.

11. The method of claim 8, wherein the step of performing analog signal processing on the detection signals to generate the plurality of output signals further comprises:

calculating a difference between the two of the detection signals to generate the first composite detection signal;

calculating a difference between the other two of the detection signals to generate the second composite detection signal;

reducing noise components of the first and the second composite detection signals to generate a plurality of filtered results; and adjusting amplitudes of the first and the second composite detection signals, so that the adjusted composite detection signals have the same amplitude.

12. The method of claim 11, wherein the step of performing digital signal processing on the digital values and generating the arithmetic output further comprises:

summing up the digital values to generate the arithmetic output.

13. The method of claim 8, wherein the step of performing digital signal processing on the digital values and generating the arithmetic output further comprises:

generating the arithmetic output according to the digital values; and controlling the analog signal processing according to the digital values.

14. A device for detecting wobbles on an optical disc, the device being utilized for generating a wobble signal according to a plurality of detection signals, the device comprising:

a pair of wobble processing modules arranged to perform wobble processing according to the detection signals to generate a plurality of digital values; and a specific arithmetic unit arranged to generate an arithmetic output according to the digital values;

wherein the device is utilized for detecting wobbles on the optical disc, and the device is utilized for generating the wobble signal according to the plurality of detection signals; and each of the wobble processing modules comprises:

an analog signal processing circuit arranged to perform analog signal processing according to the detection signals to generate an output signal;

an analog-to-digital converter (ADC) arranged to digitalize the output signal to generate a digital value of the digital values; and a digital signal processing circuit arranged to control the analog signal processing according to the digital value;

wherein the analog signal processing circuit comprises:

a low pass filter (LPF) arranged to reduce noise components of a composite detection signal of two of the detection signals to generate a filtered result; and a programmable gain amplifier/voltage gain amplifier (PGA/VGA) arranged to adjust an amplitude of the composite detection signal output from the LPF, so that the adjusted composite detection signal have the same amplitude as that of the other wobble processing module, wherein the adjusted composite detection signal is utilized as the output signal.

15. The device of claim 14, wherein the digital signal processing circuit comprises:

a digital automatic gain control (AGC) circuit arranged to control the analog signal processing circuit according to the digital value.

16. The device of claim 14, wherein the digital signal processing circuit further comprises:

a digital offset control circuit arranged to control the analog signal processing circuit according to the digital value.

17. The device of claim 14, further comprising:

a first arithmetic unit arranged to sum up two of the detection signals to generate a first composite detection signal; and a second arithmetic unit arranged to sum up another two of the detection signals to generate a second composite detection signal;

wherein the specific arithmetic unit calculates a difference between the digital values to generate the arithmetic output.

18. The device of claim 14, further comprising:

a first arithmetic unit arranged to calculate a difference between two of the detection signals to generate a first composite detection signal; and a second arithmetic unit arranged to calculate a difference between another two of the detection signals to generate a second composite detection signal;

wherein the specific arithmetic unit sums up the digital values to generate the arithmetic output.

19. A device for detecting wobbles on an optical disc, the device being utilized for generating a wobble signal according to a plurality of detection signals, the device comprising:

an analog signal processing circuit arranged to perform analog signal processing on the detection signals to generate a plurality of output signals;

a pair of analog-to-digital converters (ADCs) arranged to digitalize the output signals to generate a plurality of digital values; and a digital signal processing circuit arranged to perform digital signal processing on the digital values and generate an arithmetic output;

wherein the analog signal processing circuit comprises:

a plurality of arithmetic units arranged to perform a first arithmetic operation on two of the detection signals to generate a first composite detection signal, and arranged to perform the first arithmetic operation on another two of the detection signals to generate a second composite detection signal, wherein the first arithmetic operation is one of a summation operation or a subtraction operation.

20. A method for detecting wobbles on an optical disc, the method being utilized for generating a wobble signal according to a plurality of detection signals of a split photo-detector (PD) of an optical pickup unit (OPU), the method comprising:
performing analog signal processing on the detection signals to generate a plurality of output signals;
digitalizing the output signals to generate a plurality of digital values; and performing digital signal processing on the digital values to generate an arithmetic output;
wherein the step of performing analog signal processing on the detection signals to generate the plurality of output signals further comprises:
performing a first arithmetic operation on two of the detection signals to generate a first composite detection signal, and performing the first arithmetic operation on another two of the detection signals to generate a second composite detection signal, wherein the first arithmetic operation is one of a summation operation or a subtraction operation.

21. A device for detecting wobbles on an optical disc, the device being utilized for generating a wobble signal according to a plurality of detection signals, the device comprising:
a pair of wobble processing modules arranged to perform wobble processing according to the detection signals to generate a plurality of digital values; and
a specific arithmetic unit arranged to generate an arithmetic output according to the digital values;
wherein the device further comprises:
a plurality of arithmetic units arranged to perform a first arithmetic operation on two of the detection signals to generate a first composite detection signal, and arranged to perform the first arithmetic operation on another two of the detection signals to generate a second composite detection signal, wherein the first arithmetic operation is one of a summation operation or a subtraction operation;
wherein the specific arithmetic unit performs a second arithmetic operation on the digital values to generate the arithmetic output, wherein the second arithmetic operation is another of the summation operation or the subtraction operation.

* * * * *